United States Patent
Sterling

(10) Patent No.: US 9,441,785 B2
(45) Date of Patent: Sep. 13, 2016

(54) STORAGE DEVICE FOR WEAVE AND EXTENSION HAIR

(71) Applicant: Shelly Ann Sterling, Fort Lee, NJ (US)

(72) Inventor: Shelly Ann Sterling, Fort Lee, NJ (US)

(*) Notice: Subject to any disclaimer, the term of this patent is extended or adjusted under 35 U.S.C. 154(b) by 0 days.

(21) Appl. No.: 14/259,216

(22) Filed: Apr. 23, 2014

(65) Prior Publication Data

US 2015/0196143 A1   Jul. 16, 2015

Related U.S. Application Data

(60) Provisional application No. 61/927,803, filed on Jan. 15, 2014.

(51) Int. Cl.

| *A47F 5/08* | (2006.01) |
|---|---|
| *A47F 7/00* | (2006.01) |
| *A47G 29/00* | (2006.01) |
| *F16M 13/02* | (2006.01) |
| *A47F 5/01* | (2006.01) |
| *A47F 7/06* | (2006.01) |
| *A47G 25/24* | (2006.01) |
| *A47G 25/74* | (2006.01) |
| *A41G 5/00* | (2006.01) |

(52) U.S. Cl.
CPC ............. *F16M 13/022* (2013.01); *A47F 5/01* (2013.01); *A47F 7/065* (2013.01); *A47G 25/24* (2013.01); *A47G 25/743* (2013.01); *A41G 5/0086* (2013.01); *Y10T 29/49826* (2015.01); *Y10T 29/49874* (2015.01)

(58) Field of Classification Search
CPC ........... A47G 25/743; A47G 25/0607; A47G 25/0614; A47G 25/0621; A47G 25/0657; A47G 25/24; A47G 25/325; A47G 29/083; A47G 25/18; A47G 25/40; A47K 3/281; A47F 5/01; A47F 5/0892; A47F 5/0006; A47F 5/13; A47F 7/065; A47F 7/06; A47F 7/005; A47F 7/02; A47F 7/10; A47F 7/12; A47F 7/19; A47F 8/02; A47F 7/143; A47B 55/02; A47B 43/003; A47B 43/006; A45D 44/02; A45D 2008/008; A45D 2008/002; A45D 8/14; Y10T 24/3984; Y10T 29/49826; Y10T 29/49874; F16G 11/10; F16M 13/022; A41G 5/0086

USPC .............. 211/119, 13.1, 85.3, 85.2, 61, 60.1, 211/85.31, 85.26, 106, 106.01, 112, 118, 211/113, 181.1; 223/85, 88; 24/115 G

See application file for complete search history.

(56) References Cited

U.S. PATENT DOCUMENTS

| 273,028 | A | * | 2/1883 | Clark ........................ B25G 1/10 |
|---|---|---|---|---|
| | | | | 16/436 |
| 652,630 | A | * | 6/1900 | Peffer .............................. 211/61 |
| 740,616 | A | * | 10/1903 | Benzinger et al. ............. 211/61 |
| 809,359 | A | * | 1/1906 | Dial ........................ A47F 7/08 |
| | | | | 211/113 |
| 1,794,688 | A | * | 3/1931 | Herrmann ........................ 223/97 |
| 1,815,673 | A | * | 7/1931 | Kelley ............................ 211/119 |
| 2,018,395 | A | * | 10/1935 | Bower .................. C25D 17/06 |
| | | | | 204/297.06 |
| 2,510,452 | A | * | 6/1950 | Witt .............................. 211/85.3 |
| 2,797,030 | A | * | 6/1957 | Millhuff .......................... 223/85 |

(Continued)

*Primary Examiner* — Jennifer E Novosad

(74) *Attorney, Agent, or Firm* — Dunlap Bennett & Ludwig PLLC

(57) ABSTRACT

A storage device for weave and extension hair may include a body having downwardly curved arm portions extending in opposite directions from a central portion and a hook shaped suspending member. The body may have a plurality of nook sections. A plurality of cords having a first end and a second end may be secured along the plurality of nook sections.

4 Claims, 3 Drawing Sheets

(56) References Cited

U.S. PATENT DOCUMENTS

| | | | | |
|---|---|---|---|---|
| 2,953,828 A | * | 9/1960 | Hochman | D06F 5/008 211/113 |
| 2,997,217 A | * | 8/1961 | Levy | A47G 25/32 211/113 |
| 3,018,026 A | * | 1/1962 | Binkley et al. | 223/91 |
| 3,194,457 A | * | 7/1965 | Freilich | A47G 25/743 211/119 |
| 3,394,790 A | * | 7/1968 | Braun | 194/256 |
| 3,452,881 A | * | 7/1969 | Jamison | A47G 25/743 211/106 |
| 3,709,373 A | * | 1/1973 | Aguilar | 211/113 |
| 3,993,205 A | * | 11/1976 | Pilchard | A47G 25/743 211/116 |
| 4,091,976 A | * | 5/1978 | Morse | A47G 25/1457 206/279 |
| 4,111,341 A | * | 9/1978 | Carrozo | A45C 13/02 206/227 |
| 4,136,784 A | * | 1/1979 | Knobel | A47G 25/743 211/119 |
| 4,172,521 A | * | 10/1979 | Eubanks | D05C 1/065 206/388 |
| 4,632,285 A | * | 12/1986 | Dillingham | A47G 25/74 223/88 |
| 4,730,863 A | * | 3/1988 | Guadnola | A45F 5/10 294/142 |
| 4,778,088 A | * | 10/1988 | Miller | A47G 25/48 211/113 |
| 5,109,578 A | * | 5/1992 | Cox | A63B 60/62 24/298 |
| 5,137,158 A | * | 8/1992 | Brockway | 211/106.01 |
| 5,240,120 A | * | 8/1993 | McDonough | 211/85.2 |
| D342,357 S | * | 12/1993 | Balk | D32/58 |
| 5,303,855 A | * | 4/1994 | Veale | 223/85 |
| D361,898 S | * | 9/1995 | Rhein | D6/317 |
| 5,642,817 A | * | 7/1997 | O'Brien | 211/60.1 |
| 5,836,486 A | * | 11/1998 | Ohsugi | 223/85 |
| 5,950,844 A | * | 9/1999 | Taylor | 211/85.7 |
| 5,967,151 A | * | 10/1999 | Villani et al. | 132/200 |
| 6,036,066 A | * | 3/2000 | Giacona, III | 224/148.6 |
| 6,076,685 A | * | 6/2000 | Ramirez | A47F 5/0006 211/113 |
| 6,126,237 A | * | 10/2000 | Ritterhouse | 297/397 |
| 6,196,396 B1 | * | 3/2001 | Bennett | 211/85.3 |
| 6,330,949 B1 | * | 12/2001 | DeRisio | A47F 5/0006 211/113 |
| 6,371,285 B1 | * | 4/2002 | DuBois | 206/6.1 |
| 6,478,168 B1 | * | 11/2002 | McNamee | A47F 7/12 211/115 |
| 6,681,460 B2 | * | 1/2004 | Liu | 24/712.5 |
| 6,763,943 B1 | * | 7/2004 | Domyan | D05C 1/065 206/388 |
| 7,159,728 B2 | * | 1/2007 | Smith | 211/166 |
| D622,448 S | * | 8/2010 | Whitman | D28/73 |
| 8,020,712 B2 | * | 9/2011 | Kopp | A42B 1/002 211/118 |
| D687,637 S | * | 8/2013 | Sheldon | D6/326 |
| 8,915,384 B2 | * | 12/2014 | Immerman et al. | 211/119 |
| 8,944,298 B2 | * | 2/2015 | Hickey | A47G 25/18 211/85.3 |
| 2003/0005557 A1 | * | 1/2003 | Renn | 24/115 G |
| 2003/0116688 A1 | * | 6/2003 | Furukawa | 248/339 |
| 2008/0127991 A1 | * | 6/2008 | Moreland | 132/219 |
| 2009/0008347 A1 | * | 1/2009 | Bell | 211/61 |
| 2009/0224009 A1 | * | 9/2009 | Lubow | 223/91 |

\* cited by examiner

STORAGE DEVICE FOR WEAVE AND EXTENSION HAIR

CROSS-REFERENCE TO RELATED APPLICATION

This application claims the benefit of U.S. provisional application No. 61/927,803, filed Jan. 15, 2014, the contents of which are herein incorporated by reference.

BACKGROUND OF THE INVENTION

The present invention relates to storage devices and, more particularly, to a storage device for weave and extension hair.

Currently, there is no device that allows for a person to store a weave, extension hair, weft or the like in good condition while not in use. People will place these items in a drawer, or in a bag, which destroys the products over time. When in these locations, the extension hair or the like can become tangled, and take additional time to prepare when using again.

As can be seen, there is a need for a storage device for weave and extension hair that keeps the hair in good condition while not in use.

SUMMARY OF THE INVENTION

In one aspect of the present invention, a storage device for weave and extension hair comprises: a body having downwardly curved arm portions extending in opposite directions from a central portion and a hook shaped suspending member, wherein the body has a plurality of nook sections; and a plurality of cords having a first end and a second end, wherein the plurality of cords are secured along the plurality of nook sections.

In another aspect of the present invention, a method for maintaining extension hair when not in use comprises: placing a hair attachment piece through a loop made from a cord of a storage device, wherein the storage device is defined as having a body having downwardly curved arm portions extending in opposite directions from a central portion and a hook shaped suspending member, wherein the body has a plurality of nook sections; and a plurality of cords having a first end and a second end, wherein the plurality of cords are secured along the plurality of nook sections.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a storage device for hair attachment pieces such as a weave and extension hair that may include a body having downwardly curved arm portions extending in opposite directions from a central portion and a hook shaped suspending member. The body may have a plurality of nook sections. A plurality of cords having a first end and a second end may be secured along the plurality of nook sections.

Figure 1:
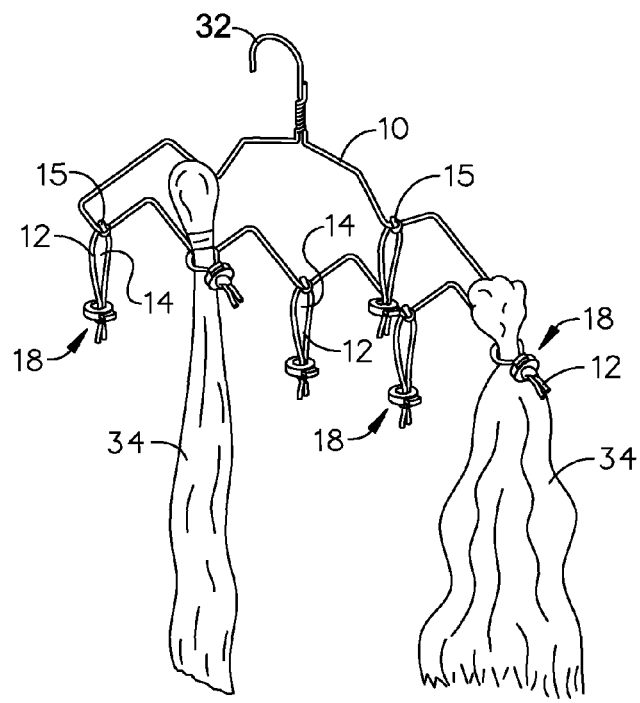
FIG. 1 is a perspective view of an exemplary embodiment of the present invention shown in use.
Figure 2:
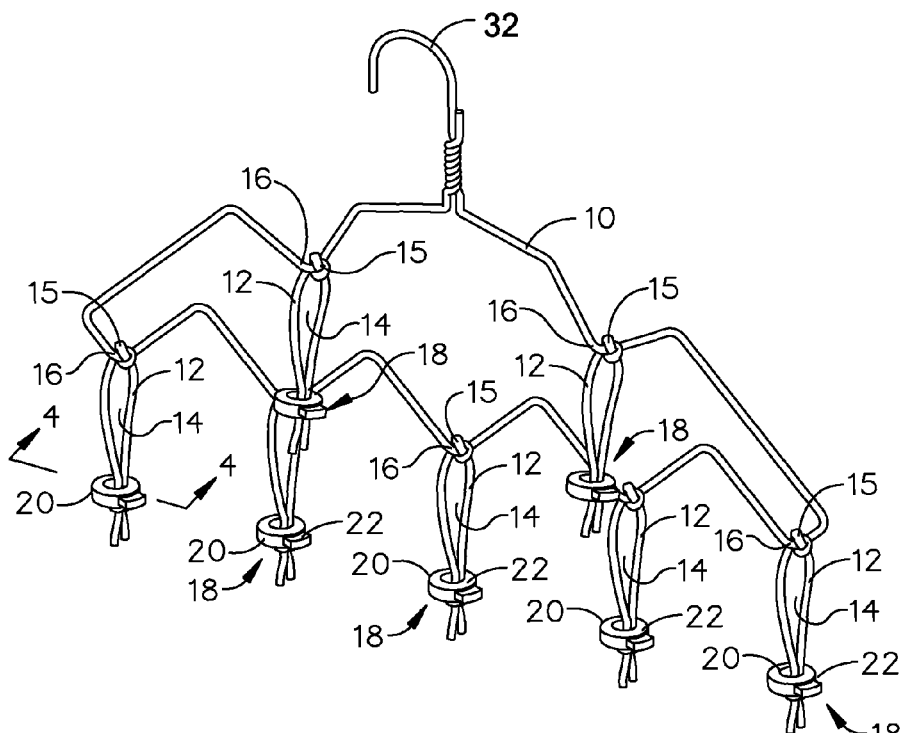
FIG. 2 is a perspective view of an exemplary embodiment of the present invention.
Figure 3:
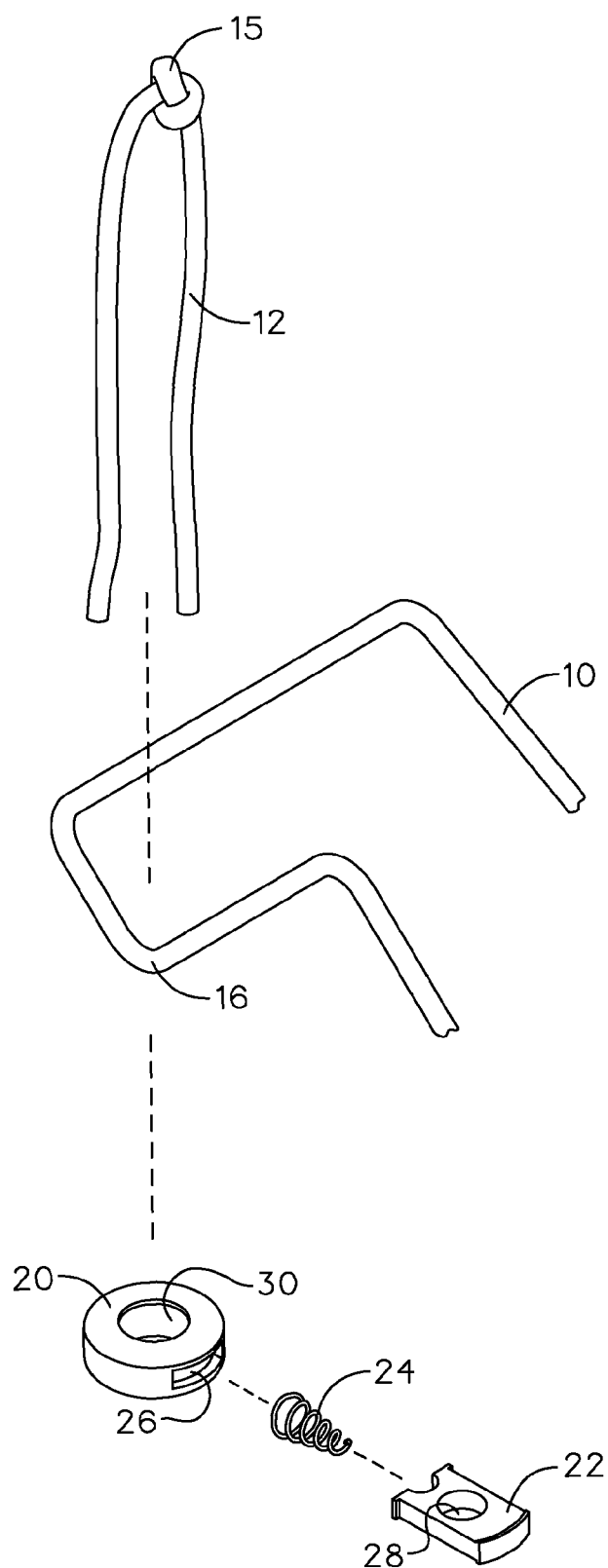
FIG. 3 is a detail exploded view of an exemplary embodiment of the present invention.
Figure 4:
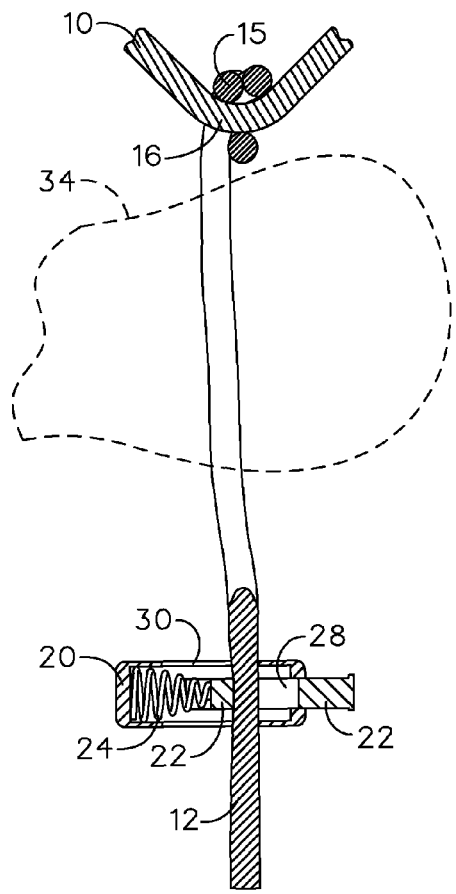
FIG. 4 is a section view of an exemplary embodiment of the present invention, taken along line 4-4 in FIG. 2.
Figure 5:
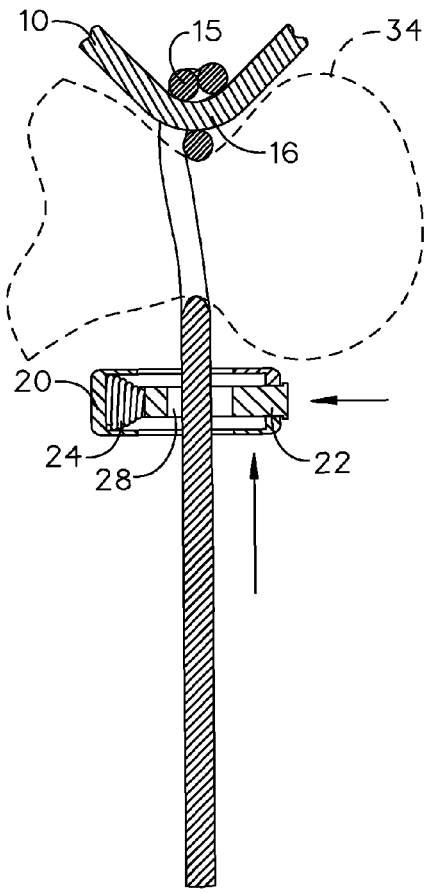
FIG. 5 is a section view of an exemplary embodiment of the present invention illustrating the tightening of loops.
Figure 6:
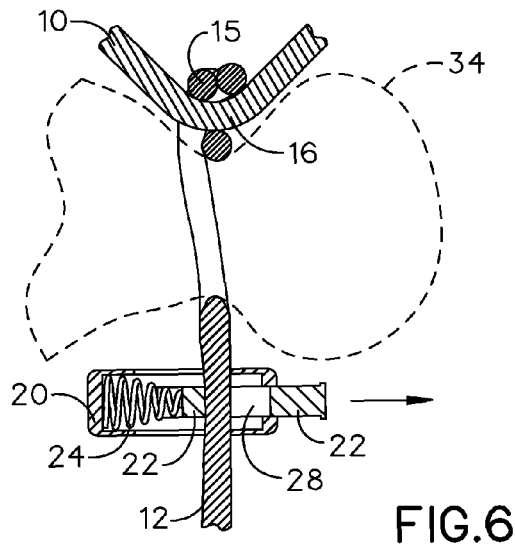
FIG. 6 is a section view of an exemplary embodiment of the present invention illustrating the loops in a closed position.

As is illustrated in FIGS. 1 through 6, a storage device for weaves and hair extensions may include a body 10. The body 10 may include downwardly curved arm portions extending in opposite directions from a central portion and a hook shaped suspending member 32. The body 10 may include a plurality of nook sections 16. A plurality of cords 12 may have a first end and a second end. The plurality of cords 12 may be secured along the plurality of nook sections 16. In certain embodiments, each cord 12 may be tied in a knot 15, which may rest along each nook section 16.

In certain embodiments, the plurality of cords 12 may be secured by a plurality of cord stops 18. The cord stops 18 may include a stop housing 20. Each stop housing 20 may hold a stop spring 24, and a stop post 22 having a stop post hole 28. The stop housing 20 may have a housing slot 26 and an opening 30. In certain embodiments, the housing slot 26 may be along a side of the stop housing 20. In certain embodiments, the opening 30 may be along a top side through to a bottom side of the stop housing 20. The stop post 22 may extend out from the housing slot 26. The first end of the cord 12 may be placed on one side of the body, and the second end may be placed on another side of the body producing a loop 14. The first end of the cord 12 and the second end of the cord 12 may be placed through the stop housing opening 30 after the cord 12 has be placed around the body 10.

A method of using the storage device may include the following. A hair attachment piece 34 such as a hair extension, a weave, or the like, may be placed within the loop 14 of the cord 12. Once a section of the hair attachment piece 34 may be through the loop 14 of the cord 12, the cord stop 18 may be used. The cord stop 18 may be moved up along the cord 12 to tighten the loop 14. Tightening the loop 14 may allow the hair attachment piece 34 to be secured in place within the loop 14. The rest of the hair attachment piece 34 may be allowed to fall below the body of the storage device, keeping the hair attachment piece 34 in a useable position. The length of the hair attachment piece 34 may be free so that the hair may not be damaged while not in use. The storage device may then be placed in a closet or against the back of a door resting on a hook, a rack or the like.

It should be understood, of course, that the foregoing relates to exemplary embodiments of the invention and that modifications may be made without departing from the spirit and scope of the invention as set forth in the following claims.

What is claimed is:

1. A storage device for weave and extension hair comprising:

a body having downwardly curved arm portions extending in opposite directions from a central portion and a hook shaped suspending member extending from the central portion, a cross member extending between a lower end of the downwardly curved arm portions, wherein the body has a plurality of substantially V-shaped nook sections defined in a spaced apart relation in the downwardly curved arm portions and along the cross member; and a plurality of cords having a first end and a second end, wherein at least one of the plurality of cords is attached to at least one of the plurality of V-shaped nook sections at an intermediate portion of the cord between the first and the second end, each of the plurality of cords defining a loop adapted to receive a hair attachment piece operatively connecting a plurality of hairs formed in one of a hair extension, a weave, or a braid.

2. The storage device of claim 1, wherein the plurality of cords each have a knot that secures the cord to a vertex of the V-shaped nook section of the body of the device.

3. The storage device of claim 2, wherein each of the plurality of cords is secured by a cord stop collecting the first end and the second end each of the plurality of cords in a loop around the body of the device.

4. A storage device for weave and extension hair comprising:

a body having downwardly curved arm portions extending in opposite directions from a central portion and a hook shaped suspending member, wherein the body has one V-shaped nook formed in each of the downwardly curved arm portions and a plurality of V-shaped nook sections defined in a cross member interconnecting the downwardly curved arm portions; and a plurality of cords having a first end and a second end, wherein each of the plurality of cords have a knot tied that attaches the cords to each of the plurality of V-shaped nook sections, wherein the plurality of cords are each secured by a cord stop collecting the first end and the second end of each cord around the body of the device, each of the plurality of cords defining a loop adapted to receive a hair attachment piece operatively connecting a plurality of hairs formed in one of a hair extension, a weave, or a braid.

* * * * *